United States Patent
Li et al.

(10) Patent No.: US 11,300,153 B2
(45) Date of Patent: Apr. 12, 2022

(54) COMPONENT HAVING METALLIC TRANSITION MATERIAL ON BASE AND METHOD OF FORMING

(71) Applicant: GM GLOBAL TECHNOLOGY OPERATIONS LLC, Detroit, MI (US)

(72) Inventors: Huaxin Li, Rochester Hills, MI (US); Liang Wang, Rochester Hills, MI (US); Richard D. Ricchi, Lapeer, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 467 days.

(21) Appl. No.: 16/297,592

(22) Filed: Mar. 9, 2019

(65) Prior Publication Data

US 2020/0282451 A1     Sep. 10, 2020

(51) Int. Cl.
*F16C 3/02* (2006.01)
*B22F 7/06* (2006.01)
(Continued)

(52) U.S. Cl.
CPC ............ *F16C 3/023* (2013.01); *B22F 7/06* (2013.01); *B22F 7/08* (2013.01); *C22C 38/44* (2013.01);
(Continued)

(58) Field of Classification Search
CPC ........ F16C 3/02; F16C 3/023; F16C 2204/20; F16C 2204/52; F16C 2204/60;
(Continued)

(56) References Cited

U.S. PATENT DOCUMENTS 4,214,932 A * 7/1980 Van Auken ............ B65H 81/06
                                                              156/187
10,247,273 B2 * 4/2019 Bremmer .................. B32B 1/08
(Continued)

FOREIGN PATENT DOCUMENTS

CH           268266 A  *  5/1950  ............... F16D 3/50
CN        103231203 A      8/2013
(Continued)

OTHER PUBLICATIONS

U.S. Appl. No. 15/789,052, filed Oct. 20, 2017 by GM Global Technology Operations LLC, titled "Method for Depositing a Coating of First Metal on a Second Metal Component and Component Produced by the Method."
(Continued)

*Primary Examiner* — Adam D Rogers
(74) *Attorney, Agent, or Firm* — Vivacqua Crane PLLC

(57) ABSTRACT

A component includes a base formed of a majority of a first metallic element and a shell adhered to the base. The shell includes an inner portion having an inner surface contacting the base, an outer portion having an outer surface, and an intermediate zone connecting the inner portion to the outer portion. The shell is formed of a multi-element transition material, where the multi-element transition material includes a majority of a second metallic element at the inner surface and a majority of a third metallic element at the outer surface. The intermediate zone includes both the second and third metallic elements. Each of the first, second, and third metallic elements are different from one another. The component may be an automotive shaft. A method of forming the component may include depositing first and second powders on the base to form the inner and outer portions and the intermediate zone.

13 Claims, 2 Drawing Sheets

(51) Int. Cl.
  *B22F 7/08*    (2006.01)
  *C23C 28/02*   (2006.01)
  *C22C 38/46*   (2006.01)
  *C22C 38/44*   (2006.01)
  *C22C 38/48*   (2006.01)

(52) U.S. Cl.
  CPC .............. *C22C 38/46* (2013.01); *C22C 38/48* (2013.01); *C23C 28/021* (2013.01); *C23C 28/028* (2013.01); *F16C 3/02* (2013.01); *F16C 2204/20* (2013.01); *F16C 2204/52* (2013.01); *F16C 2204/60* (2013.01); *F16C 2220/20* (2013.01)

(58) Field of Classification Search
  CPC ..... F16C 2220/20; C22C 38/44; C22C 38/46; C22C 38/48; C23C 28/021; C23C 28/028; B22F 7/08; B22F 7/06
  See application file for complete search history.

(56) References Cited

U.S. PATENT DOCUMENTS

| | | | | |
|---|---|---|---|---|
| 10,641,354 | B1* | 5/2020 | Conger | F16F 15/12 |
| 2009/0197690 | A1* | 8/2009 | Lyscio | F16F 7/04 |
| | | | | 464/180 |
| 2019/0119809 | A1* | 4/2019 | Li | C23C 14/022 |
| 2019/0301519 | A1* | 10/2019 | Dorman | B29C 66/542 |
| 2020/0224711 | A1* | 7/2020 | Reed | B29C 73/10 |
| 2020/0378433 | A1* | 12/2020 | Lewis | F16C 3/026 |

FOREIGN PATENT DOCUMENTS

| | | | | |
|---|---|---|---|---|
| CN | 105665709 A | | 6/2016 | |
| CN | 112743351 A | * | 5/2021 | |
| DE | 102005017561 A1 | * | 10/2006 | F16C 3/02 |
| EP | 0324894 A2 | * | 7/1989 | F16H 57/0006 |
| EP | 0520719 A1 | * | 12/1992 | F16F 15/322 |

OTHER PUBLICATIONS

Metal 3D Printing: The Ultimate Guide, 3DEO.

* cited by examiner

COMPONENT HAVING METALLIC TRANSITION MATERIAL ON BASE AND METHOD OF FORMING

FIELD

The present disclosure relates to an automotive component having a metallic base and a metallic shell formed of a different material, and a method of forming such a component.

INTRODUCTION

Automotive shafts are typically formed of steel. Surface induction hardening may be performed to provide wear resistance. Although automotive manufacturers typically desire to reduce overall weight within a vehicle, components must be able to meet performance standards. As such, lightweight metals, such as aluminum, may not be suitable alone to use for a shaft, because the aluminum may not provide adequate wear resistance. Steel may be used to the coat aluminum, but welding aluminum and steel together presents the issue of forming undesirable intermetallic compounds at the joined surfaces, which may result in break-off of the steel. Accordingly, there is a need for lightweight components that meet wear resistance requirements.

SUMMARY

The present disclosure provides a metallic base component having a shell disposed thereon. The shell is formed of a multi-element transition material that includes a majority of a first metallic element at the interface between the base and the shell and a majority of a second element at the outer surface. In some forms, a lightweight metal, such as aluminum, is used as the base or core, and an element that bonds well to the aluminum is disposed directly on the aluminum base or core. Then, the element that bonds well, such as nickel, may be transitioned to a wear-resistant metal, such as steel.

In one form, which may be combined with or separate from the other forms disclosed herein, a component includes a base formed of a majority of a first metallic element and a shell adhered to the base. The shell includes an inner portion having an inner surface contacting the base, an outer portion having an outer surface, and an intermediate zone connecting the inner portion to the outer portion. The shell is formed of a multi-element transition material. The multi-element transition material is formed of a majority of a second metallic element at the inner surface and a majority of a third metallic element at the outer surface. The intermediate zone includes both the second and third metallic elements. Each of the first, second, and third metallic elements are different from one another.

In another form, which may be combined with or separate from the other forms disclosed herein, an automotive shaft is provided that includes a core formed of a majority of a first metallic element and a shell surrounding the core and being adhered to the core. The shell includes an inner portion having an inner surface contacting the core, an outer portion having an outer surface, and an intermediate zone connecting the inner portion to the outer portion. The shell is formed of a multi-element transition material. The multi-element transition material consists of a majority of a second metallic element at the inner surface and a majority of a third metallic element at the outer surface. The intermediate zone includes both the second and third metallic elements. Each of the first, second, and third metallic elements are different from one another.

In yet another form, which may be combined with or separate from the other forms disclosed herein, a method of forming a multi-metal object is provided. The method includes forming a base comprising a majority of a first metallic element. The method also includes induction heating a first powder and depositing the first powder onto the base resulting in a shell inner portion formed from the first powder and adhered to the base. A majority of the first powder is formed of a second metallic element. The method includes mixing a second powder with the first powder to form a mixture, induction heating the mixture, and depositing the mixture onto the shell inner portion to form a shell intermediate zone adhered to the shell inner portion. A majority of the second powder is formed of a third metallic element. The first, second, and third metallic elements are different from one another. The method further includes induction heating the second powder and depositing the second powder onto the shell intermediate zone, resulting in a shell outer portion formed from the second powder and adhered to the shell intermediate zone.

Additional features may be provided, including but not limited to the following: the first metallic element being aluminum; the second metallic element being nickel; the third metallic element being iron; the shell being formed of steel at the outer surface; the shell being formed of a nickel-based alloy at the inner surface; wherein the transition material gradually transitions from the nickel-based alloy at the inner surface to steel at the outer surface; wherein the shell is formed of a nickel-based alloy at the inner surface and of a steel alloy at the outer surface; the intermediate zone including a first portion disposed adjacent to the inner portion; the first portion including at least 80 weight percent of the nickel-based alloy; the intermediate zone including a second portion disposed adjacent to the outer portion; the second portion including at least 80 weight percent of the steel alloy; wherein the nickel-based alloy consists of at least 60 weight percent nickel; wherein the inner portion is formed of the nickel-based alloy; the inner portion being at least 0.05 mm thick; the outer portion being formed of the steel alloy; the outer portion being at least 0.05 mm thick; the shell having a thickness in the range of 0.2 to 3.0 mm; and the component being an automotive shaft.

In some variations, the steel alloy consists essentially of: 0-1.0 weight percent carbon, 0.4-1.2 weight percent manganese, 0-5.0 weight percent chromium, 0-2.00 weight percent nickel, 0-1.0 weight percent molybdenum, 0-0.5 weight percent vanadium, 0-0.5 weight percent niobium, and the balance iron.

The method may optionally further include one or more of the following: performing the induction heating steps at a heating distance from the base, the heating distance being less than 10 centimeters; depositing the first and second powders with direct energy deposition; applying a laser beam to the powders to adhere the first powder onto the base to form a shell inner portion, the mixture onto the shell inner portion to form a shell intermediate zone, and the second powder onto the shell intermediate zone to form a shell outer portion; and gradually mixing in a greater amount of the second powder and a lesser amount of the first powder from the shell inner portion to the shell outer portion.

In this manner, the mass of a component may be significantly reduced. Such mass reduction in an automotive application, such as, for example, a transmission shaft, may significantly improve fuel economy, efficiency, performance, reliability, and durability.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The drawings described herein are for illustration purposes only and are not intended to limit the scope of the present disclosure in any way.

DETAILED DESCRIPTION

Figure 1:
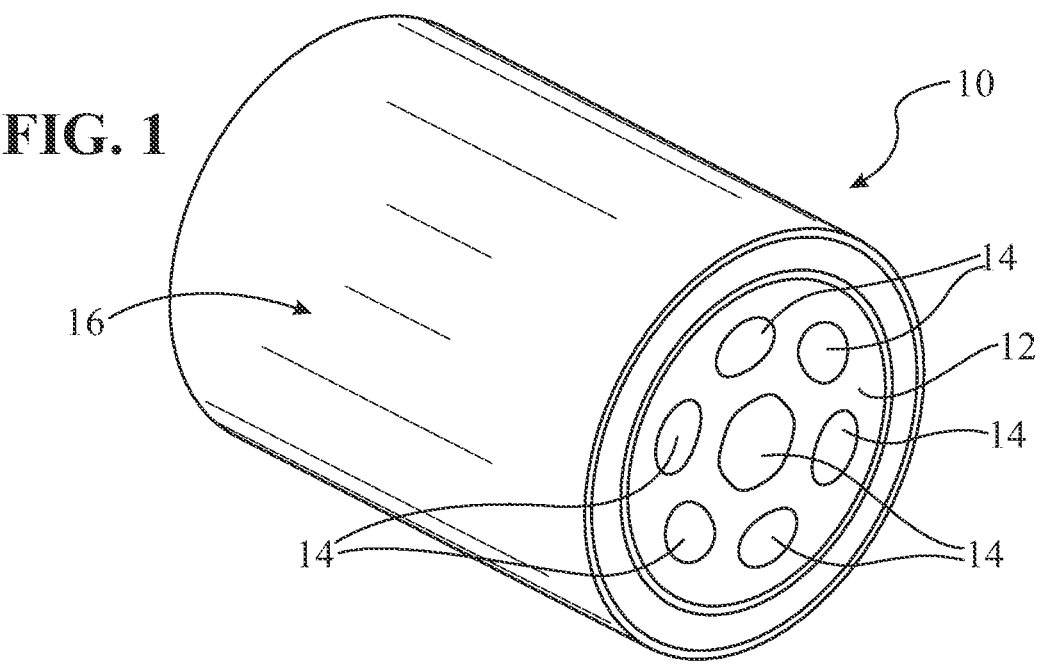
FIG. 1 is a perspective view of an automotive shaft, in accordance with the principles of the present disclosure.
Figure 2:
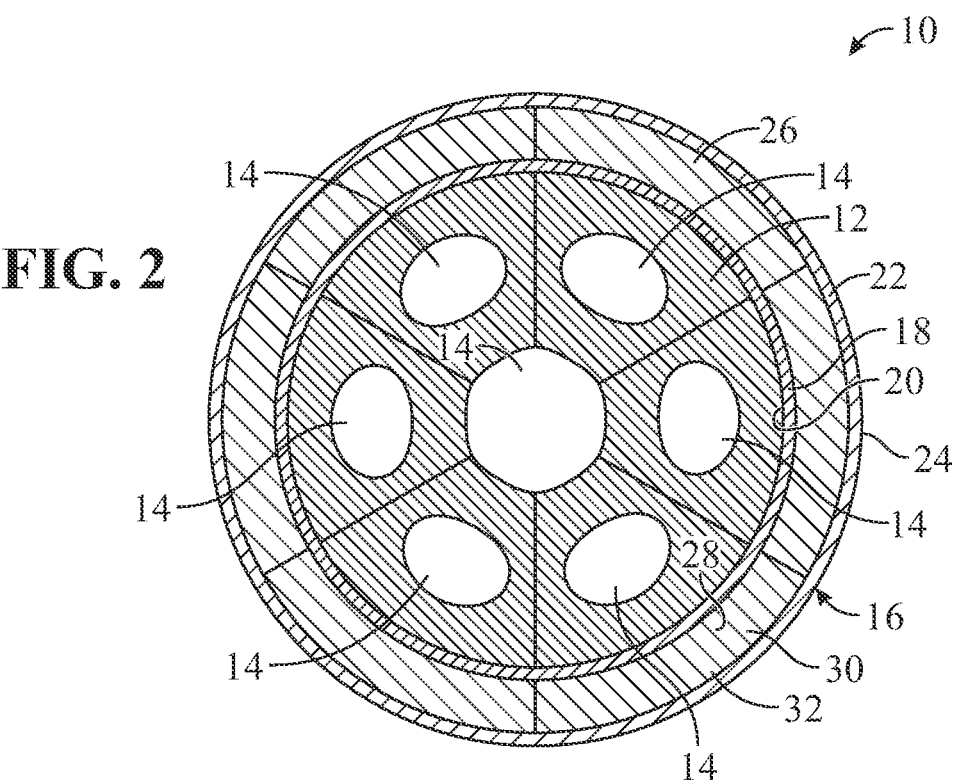
FIG. 2 is a schematic cross-sectional view of the automotive shaft of FIG. 1, according to the principles of the present disclosure.

Referring now to the drawings, wherein like numerals represent like elements, a component is provided and generally indicated at 10 in FIGS. 1 and 2. The component 10 may be, for example, an automotive component, such as a light weight transmission shaft having good wear resistance. The component 10 includes a light weight core or base 12 that may have strategic portions removed to form passages 14 formed therethrough, which may aid with light-weighting or with attaching the component 10 to another structure (not shown).

Adhered to the core or base 12 is a shell 16. The shell 16 includes multiple metals, which are best seen in FIG. 2. The shell 16 includes an inner portion 18 having an inner surface 20 contacting the base 12, an outer portion 22 having an outer surface 24, and an intermediate zone 26 connecting the inner portion 18 to the outer portion 22. The shell 16 is formed of a multi-element transition material, where the multi-element transition material is formed of a majority of one metallic element at the inner surface 20 and of a majority of another different metallic element at the outer surface 24. The intermediate zone 26, however, includes both of the metallic elements that make up the inner portion 18 and the outer portion 22.

In some variations, the materials that make up the base 12, the inner portion 18, and the outer portion 22 are each different from one another. In one variation, the base 12 is made of a light weight metallic material, such as aluminum or an aluminum alloy. The shell 16 is formed of more than one different metallic material. For example, the shell 16 may be formed of a majority of nickel in the inner portion 18, a majority of iron in the outer portion 22, and of a mixture of the two in the intermediate zone 26.

In some examples, the shell 16 is formed of a steel alloy in the outer portion 22 and at the outer surface 24, and the shell 16 is formed of a nickel-based alloy in the inner portion 18 and at the inner surface 20. The nickel-based alloy may include at least 60 weight percent nickel (in some variations, at least 70 weight percent nickel), and the steel alloy may be a self-quenchable steel, such as A2 tool steel. For example, the steel alloy could include 0-1.0 weight percent carbon, 0.4-1.2 weight percent manganese, 0-5.0 weight percent chromium, 0-2.00 weight percent nickel, 0-1.0 weight percent molybdenum, 0-0.5 weight percent vanadium, 0-0.5 weight percent niobium, and the balance iron. In one example, the steel alloy may consist of about 1.0 weight percent carbon, about 1.0 weight percent manganese, about 5.0 weight percent chromium, about 0.3 weight percent nickel, about 1.0 weight percent molybdenum, 0.15 to 0.5 weight percent vanadium, and the balance iron. The use of the self-quenched steel allows the shaft 10 to be used without requiring carburization or induction hardening to satisfy performance requirements.

In some forms, the nickel-to-steel transition material of the shell 16 gradually transitions from the nickel-based alloy at the inner surface 20 to the steel alloy at the outer surface 24. For example, the inner portion 18 of the shell 16 may be formed solely of, or substantially of, a nickel-based alloy, and the thickness of the inner portion 18 may be in the range of 0.02 to 0.5 mm, by way of example. In some examples, the inner portion 18 is at least 0.05 mm thick.

The intermediate zone 26 may then include some steel with mostly the nickel-based alloy at a portion directly adjacent to the inner portion 18. For example, the intermediate zone 26 may include a first portion 28 disposed adjacent to the inner portion 18, where the first portion 28 includes at least 80 weight percent of the nickel-based alloy, and the balance may be formed of the steel alloy. The intermediate zone 26 may include, for example, equal amounts of the steel-alloy and the nickel-based alloy at a center 30 or at another non-central portion of the intermediate zone 26. The intermediate zone 26 may include a second portion 32 disposed adjacent to the outer portion 22, where the second portion 32 includes at least 80 weight percent of the steel alloy and the balance may be formed of the nickel-based alloy.

The outer portion 22 of the shell 16 may be formed solely of, or substantially of, a steel alloy, and the thickness of the outer portion 22 may be in the range of 0.02 to 0.5 mm, by way of example. In some examples, the outer portion 22 is at least 0.05 mm thick. The entire shell 16 could have a thickness in the range of 0.2 to 3.0 mm, by way of example.

Figure 3:
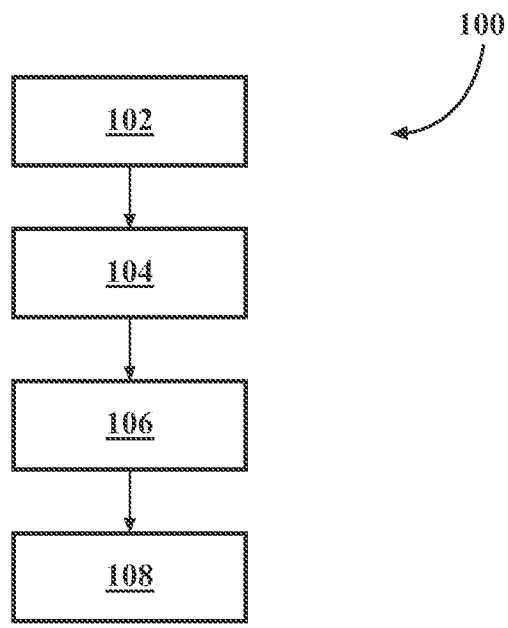
FIG. 3 is a schematic diagram of an apparatus for performing a method of forming a multi-metal object, such as the shaft of FIGS. 1-2, in accordance with the principles of the present disclosure.
Figure 4:
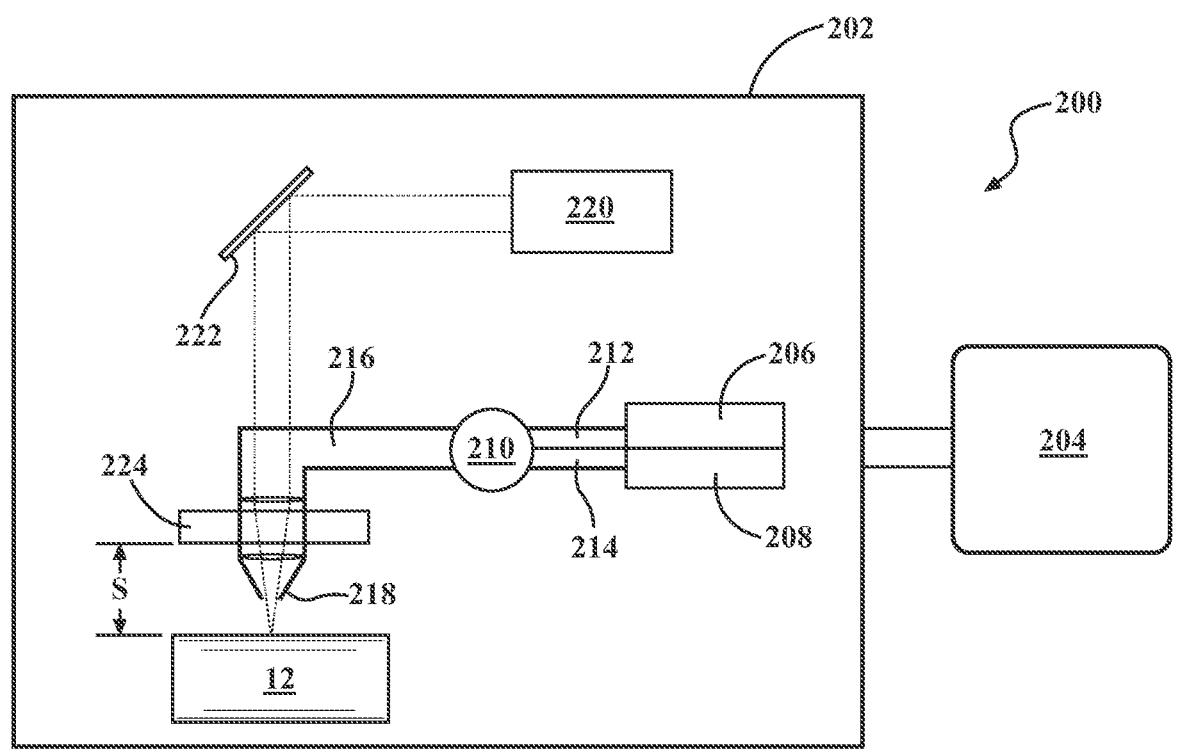
FIG. 4 is a block diagram illustrating a method of forming a multi-metal object, such as the shaft of FIGS. 1-2, according to the principles of the present disclosure.

Referring now to FIGS. 3 and 4, FIG. 3 shows a method 100 of forming a multi-metal object, such as the shaft 10, and FIG. 4 shows a schematic illustration of an example apparatus 200 for performing certain steps of the method 100.

The method 100 includes a step 102 of forming the core or base 12 comprising a majority of a first metallic element, such as aluminum. For example, the core or base 12 could be formed by precision casting, such as high pressure die casting and having an optimized weight and strength design, such as that shown in FIGS. 1 and 2.

Referring to FIG. 4, the apparatus 200 is an exemplary deposition system for applying the shell 16 onto the base 12. In this example, the apparatus 200 may use a direct energy deposition process to apply the shell 16 onto the base 12. The deposition may optionally occur in a chamber 202, where an inert gas is fed into the chamber 202 from an inert gas source 204 to create a vacuum within the chamber 202.

The system 200 may operate within an inert gas atmosphere to reduce and/or prevent any oxidation of the surface of the base 12 and/or the powders.

A first powder supply 206 and a second powder supply 208 include two different metallic powders that will form the shell 16; more particularly, the first powder supply 206 includes a powder made of a first metallic material, such as a nickel-based alloy, and the second powder supply 208 includes a second powder made of a second metallic material, such as steel. The first powder is fed to a mixer 210 through a first tube 212, and the second powder is fed to the mixer 210 through a second tube 214. From the mixer 210, a single tube 216 supplies the powder metal material to a nozzle 218 for application onto the base 12. The first powder metal from the first powder metal source 206 may be solely supplied to the mixer 210, the second powder metal from the second powder metal source 208 may be solely supplied to the mixer 210, or a combination of the powder metals from both powder metal sources 206, 208 may be supplied to the mixer 210, if desired. In this way, any desired combination of the two different powder metals may be applied through the nozzle 218.

A laser source 220 is provided to use a direct energy deposition process, or another laser metal deposition process, to apply a laser beam to the powder metal being dispensed from the nozzle 218 to deposit the powder metal onto the base 12. The laser beam from the laser source 220 may be reflected on a mirror 222 to be applied to the powder metal, to result in a metal coating adhered to the core or base 12, which is firmly bonded directly to the base 12. Preferably, the bond between the metal coating and the base 12 is a metallurgical bond.

Furthermore, the system 200 may include an induction heater 224 disposed around, adjacent to, or near the tube 216 and the nozzle 218. The induction heater 224 is disposed a short distance S from the base 12, in order to apply heat to the powder just before the powder is applied to the base 12. To that end, the short distance S may be less than 10 cm, less than 5 cm, or even less than 1 cm from the base 12.

The method 100 includes a step 104 of induction heating the first powder, such as a powder formed of a nickel-based alloy as described above, and depositing the first powder onto the base 12, resulting in a shell inner portion 18 formed from the first powder and adhered to the base 12. For example, only the first powder from the first powder source 206 may be used to form the shell inner portion 18. The induction heating temperature range may be between 450 and 850 degrees Celsius.

Next, the method 100 includes a step 106 of mixing a second powder with the first powder to form a mixture, induction heating the mixture, and depositing the mixture onto the shell inner portion to form a shell intermediate zone 26 adhered to the shell inner portion 18. For example, the mixer 210 may be used to mix powder from both powder sources 206, 208, and then the mixed powder may be induction heated by the induction heater 224 and deposited onto the shell inner portion that is formed on the base 12, for example, via the laser. The second powder may be a steel alloy as described above, so that the mixture includes both the nickel-based alloy powder and the steel alloy powder. The induction heating temperature range in step 106 may also be between 450 and 850 degrees Celsius.

Ratios of the amounts of the first and second powders provided from each of the powder sources 206, 208 may be gradually changed from a high amount of the first powder and a low amount of the second powder, to a low amount of the first powder and a high amount of the second powder. For example, as described above, a first portion 28 of the intermediate zone 26 may include at least 80 weight percent (or greater) of the nickel-based alloy, and the balance may be formed of the steel alloy. Preferably, the amount of each powder is gradually transitioned in the first portion 28, and some point in the intermediate zone 26, there are equal amounts of each powder. After the equality point, a second portion 32 of the intermediate zone 26 may gradually introduce greater amounts of steel and at one part, the outer portion 32 includes at least 80 weight percent (or greater) of the steel alloy and the balance may be formed of the nickel-based alloy.

After the intermediate zone 26 is formed, the method 100 proceeds to a step 108 of induction heating the second powder (only) and depositing the second powder onto the shell intermediate zone 26 to form the shell outer portion 22 on the shell intermediate zone 26. Thus, the shell outer portion 22 comprises only the second powder and none of the first powder. The induction heating temperature range in step 108 may also be between 450 and 850 degrees Celsius. Providing only steel at the outer surface 24 of the shell 16 provides the desired wear resistance. The outer surface 24 may then be ground and super-finished as desired to reduce friction.

While the present disclosure generally describes the use of a laser source to apply the powder onto the base 12, it should be understood that other apparatuses may be used to cause deposition of the powders, such as an electron beam. In another alternative, the two different metallic materials may be provided in other forms, such as in the form of wires. The inert gas source 204 may be omitted in some variations, as well.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A component comprising:
a base formed of a majority of a first metallic element; and
a shell adhered to the base, the shell comprising an inner portion having an inner surface contacting the base, an outer portion having an outer surface, and an intermediate zone connecting the inner portion to the outer portion, the shell being formed of a multi-element transition material, the multi-element transition material being formed of a majority of a second metallic element at the inner surface and the multi-element transition material being formed of a majority of a third metallic element at the outer surface, the intermediate zone comprising both the second and third metallic elements, wherein the first metallic element is aluminum, the second metallic element is nickel, and the third metallic element is iron.

2. The component of claim 1, wherein the inner portion being at least 0.05 mm thick, the outer portion being at least 0.05 mm thick.

3. The component of claim 2, the shell having a thickness in the range of 0.2 to 3.0 mm.

4. The component of claim 1 being an automotive shaft.

5. An automotive shaft comprising:
a core formed of a majority of a first metallic element; and
a shell surrounding the core and being adhered to the core, the shell comprising an inner portion having an inner surface contacting the core, an outer portion having an outer surface, and an intermediate zone connecting the inner portion to the outer portion, the shell being formed of a multi-element transition material, the multi-element transition material consisting of a majority of a second metallic element at the inner surface and the multi-element transition material consisting of a majority of a third metallic element at the outer surface, the intermediate zone comprising both the second and third metallic elements, the first metallic element being aluminum, the second metallic element being a nickel-based alloy, and the third metallic element being a steel alloy.

6. The automotive shaft of claim 5, wherein the multi-element transition material transitions from the nickel-based alloy at the inner surface to the steel alloy at the outer surface.

7. The automotive shaft of claim 5, wherein the intermediate zone includes a first portion disposed adjacent to the inner portion, the first portion including at least 80 weight percent of the nickel-based alloy, the intermediate zone including a second portion disposed adjacent to the outer portion, the second portion including at least 80 weight percent of the steel alloy.

8. The automotive shaft of claim 7, the steel alloy consisting essentially of:
0 to 1.0 weight percent carbon;
0.4 to 1.2 weight percent manganese;
0 to 5.0 weight percent chromium;
0 to 2.00 weight percent nickel;
0 to 1.0 weight percent molybdenum;
0 to 0.5 weight percent vanadium;
0 to 0.5 weight percent niobium; and
the balance iron.

9. A method of forming a multi-metal object, the method comprising:

forming a base comprising a majority of a first metallic element, wherein the first metallic element is aluminum;

induction heating a first powder and depositing the first powder onto the base resulting in a shell inner portion formed from the first powder and adhered to the base, a majority of the first powder being formed of a second metallic element, wherein the second metallic element is nickel;

mixing a second powder with the first powder to form a mixture, induction heating the mixture, and depositing the mixture onto the shell inner portion to form a shell intermediate zone adhered to the shell inner portion, a majority of the second powder being formed of a third metallic element, wherein the third metallic element is iron; and induction heating the second powder and depositing the second powder onto the shell intermediate zone resulting in a shell outer portion formed from the second powder and adhered to the shell intermediate zone, wherein the shell intermediate zone connects the shell inner portion to the shell outer portion.

10. The method of claim 9, further comprising performing the induction heating steps at a heating distance from the base, the heating distance being less than 10 centimeters.

11. The method of claim 10, further comprising depositing the first and second powders with direct energy deposition.

12. The method of claim 11, further comprising applying a laser beam to the powders to adhere the first powder onto the base, the mixture onto the shell inner portion, and the second powder onto the shell intermediate zone.

13. The method of claim 12, further comprising gradually mixing in a greater amount of the second powder and a lesser amount of the first powder from the shell inner portion to the shell outer portion.

* * * * *